(12) United States Patent
Goenka et al.

(10) Patent No.: US 10,931,681 B2
(45) Date of Patent: Feb. 23, 2021

(54) SECURING RESOURCES

(71) Applicant: Oath Inc., New York, NY (US)

(72) Inventors: Mohit Goenka, Santa Clara, CA (US);
Ashish Khushal Dharamshi, Sunnyvale, CA (US); Nikita Varma, Milpitas, CA (US)

(73) Assignee: Verizon Media Inc., New York, NY (US)

( * ) Notice: Subject to any disclaimer, the term of this patent is extended or adjusted under 35 U.S.C. 154(b) by 104 days.

(21) Appl. No.: 16/153,012

(22) Filed: Oct. 5, 2018

(65) Prior Publication Data

US 2020/0112569 A1 Apr. 9, 2020

(51) Int. Cl.
*H04L 29/06* (2006.01)
*H04W 12/00* (2009.01)
*H04L 9/08* (2006.01)
*G06F 21/62* (2013.01)

(52) U.S. Cl.
CPC ........ *H04L 63/107* (2013.01); *H04L 63/0876* (2013.01); *H04L 63/105* (2013.01); *H04L 9/0872* (2013.01); *H04L 63/0492* (2013.01); *H04L 63/10* (2013.01); *H04W 12/005* (2019.01)

(58) Field of Classification Search
CPC . H04L 63/107; H04L 63/0876; H04L 63/105; H04L 29/06; H04L 9/08; H04L 9/0872; H04L 63/10; H04L 63/0492; G06F 3/0484; G06F 21/62; H04W 12/00; H04W 12/005
See application file for complete search history.

(56) References Cited

U.S. PATENT DOCUMENTS

| | | | |
|---|---|---|---|
| 10,225,264 B2 * | 3/2019 | Grim | H04L 63/0861 |
| 10,231,128 B1 * | 3/2019 | Ziraknejad | H04L 9/0825 |
| 10,742,648 B2 * | 8/2020 | Magyar | H04L 63/126 |
| 10,771,458 B1 * | 9/2020 | Xia | H04W 12/06 |
| 2017/0244722 A1 * | 8/2017 | Zehler | H04L 63/068 |
| 2020/0112569 A1 * | 4/2020 | Goenka | H04L 63/105 |

* cited by examiner

*Primary Examiner* — Jayesh M Jhaveri
(74) *Attorney, Agent, or Firm* — Cooper Legal Group, LLC

(57) ABSTRACT

One or more computing devices, systems, and/or methods for securing resources are provided. For example, a request to access resources may be received from a first device. A verification process may be performed using a second device, to verify an identity associated with the request. The first device may be provided with access to the resources. The access may be a first level of access. It may be determined that a distance between the first device and the second device is greater than a threshold distance. Responsive to determining that the distance is greater than the threshold distance, the access to the resources may be modified to a second level of access. The second level of access may be different than the first level of access.

20 Claims, 11 Drawing Sheets

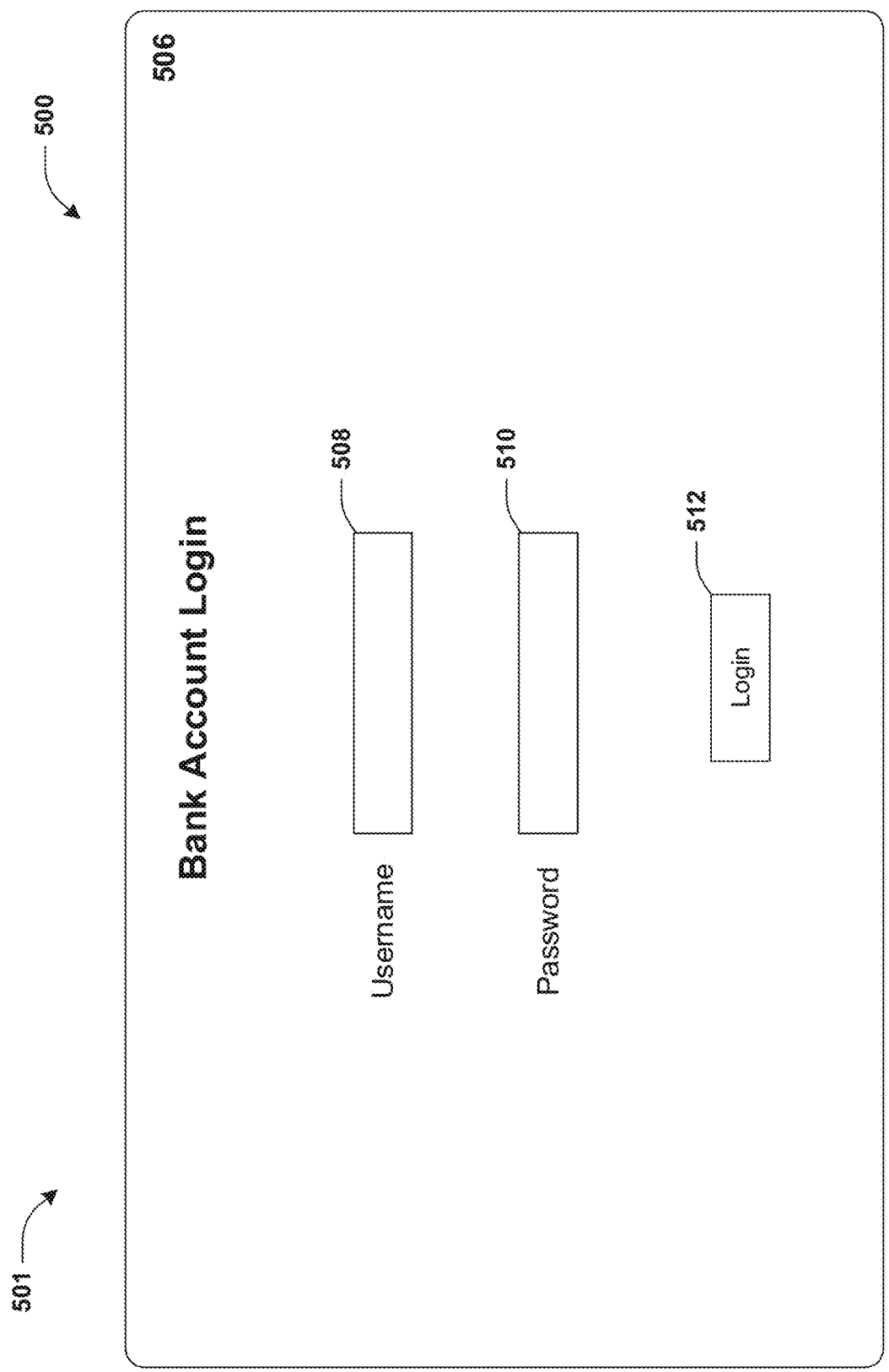

SECURING RESOURCES

BACKGROUND

Many services may allow a user to create an account for accessing resources, such as for consuming content (e.g., emails, messages, news content, videos, music, bank account information, etc.), performing actions (e.g., sending emails, sending messages, uploading content to platforms, transferring funds, etc.) and/or for managing the account (e.g., changing settings of the account). The user may use a user interface to access resources associated with the account using a device. The user may leave the device unattended (e.g., walk away from the device) and/or the user interface may be left open. A second user may interact with the user interface and/or perform malicious actions (e.g., copy data associated with the account, perform unwanted transactions, etc.).

SUMMARY

In accordance with the present disclosure, one or more computing devices and/or methods are provided. In an example, a login interface associated with a service may be provided to a first device. A request to access resources of the service may be received via the login interface. The resources may be associated with a user account. Responsive to receiving the request, a verification process may be performed to verify an identity associated with the request received via the login interface. The verification process may be performed using a second device associated with the user account. Responsive to verifying the identity associated with the request, the first device may be provided with access to the resources. The access may be a first level of access. It may be determined that a distance between the first device and the second device is greater than a threshold distance. Responsive to determining that the distance between the first device and the second device is greater than the threshold distance, the access to the resources may be modified to a second level of access different than the first level of access.

In an example, a request to access resources of a service may be transmitted using a first device. The resources may be associated with a first user account. A verification process may be performed to verify an identity associated with the request. A user interface associated with the resources may be displayed. A distance between the first device and a second device associated with the user account may be monitored. It may be detected that the distance between the first device and the second device is greater than a threshold distance. Responsive to detecting that the distance between the first device and the second device is greater than the threshold distance, a first message may be transmitted to a server. The first message may be indicative of the distance between the first device and the second device being greater than the threshold distance.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for securing resources, where a graphical user interface of a first client device is controlled to display a login interface of a service interface.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
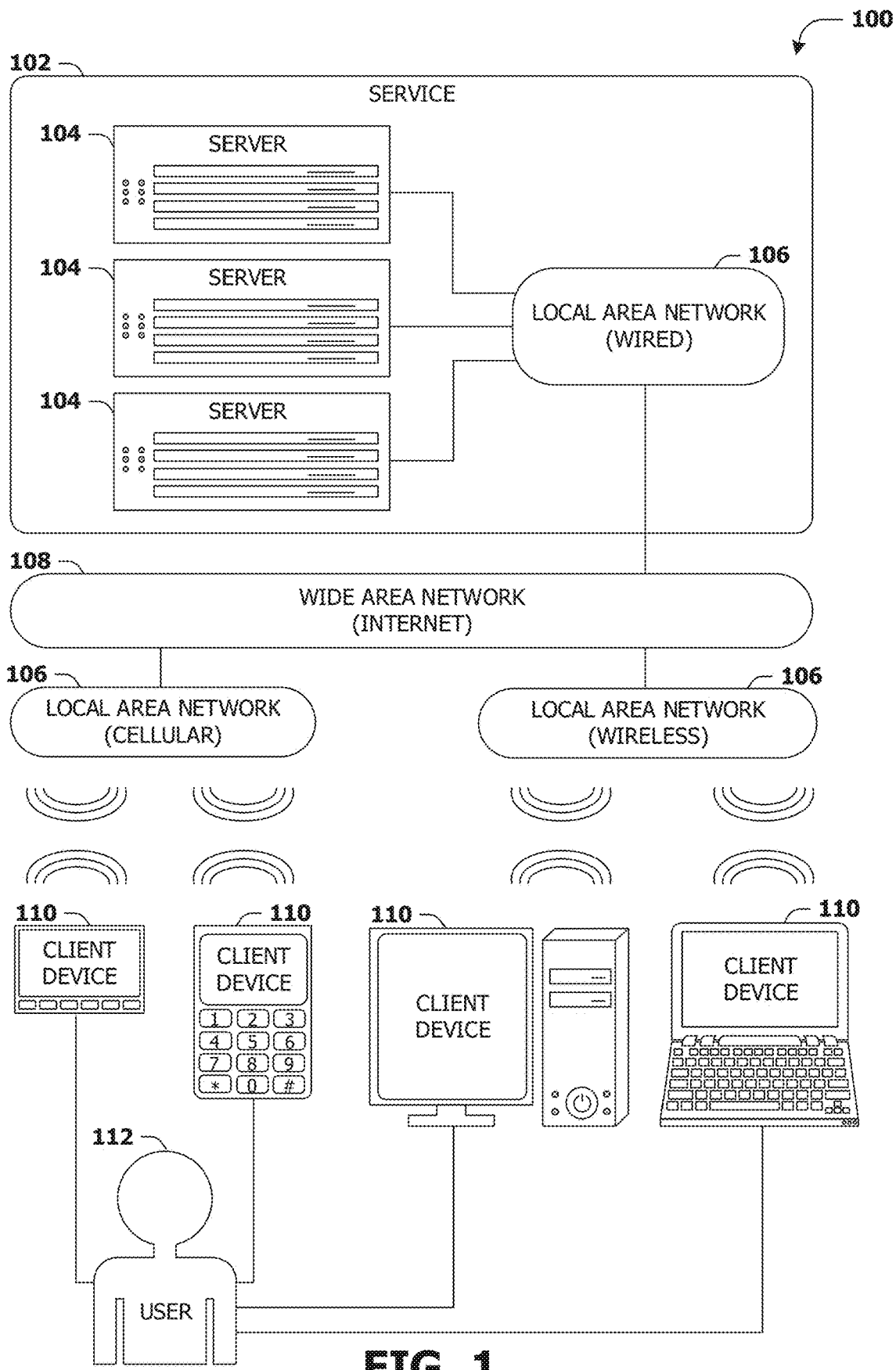
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
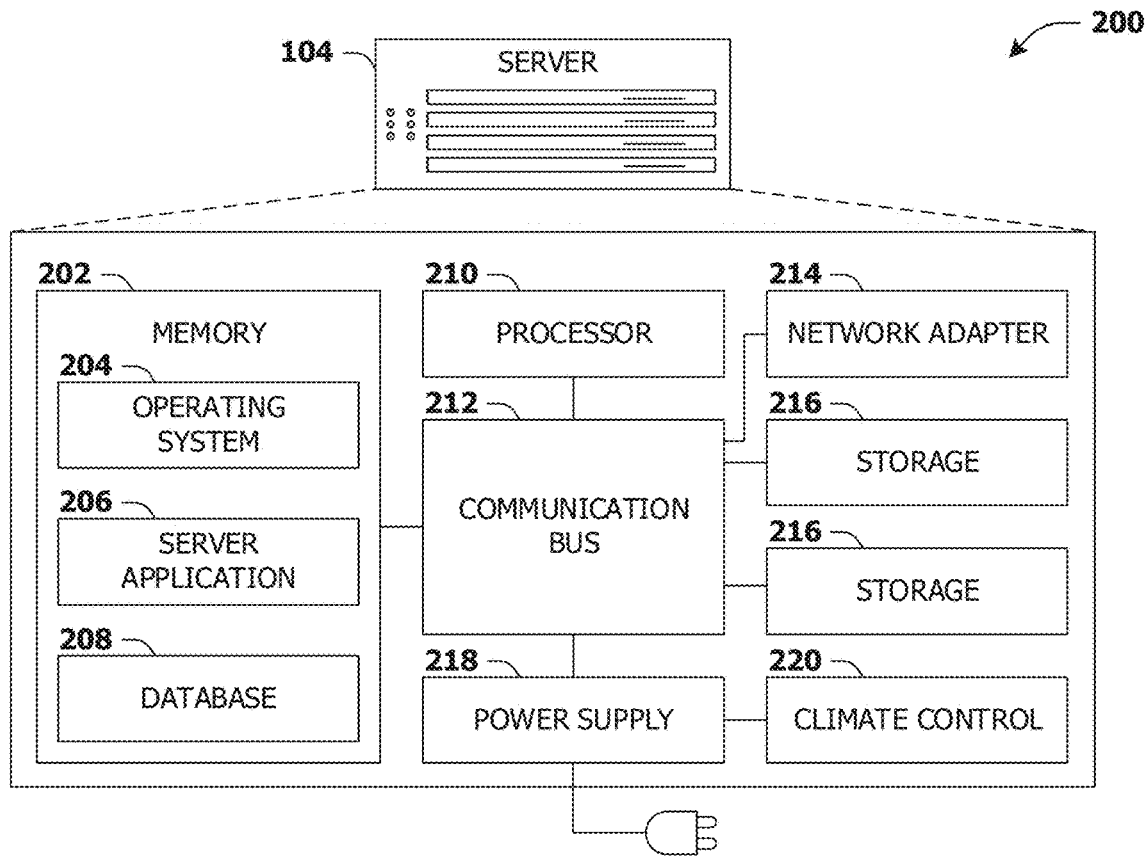
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
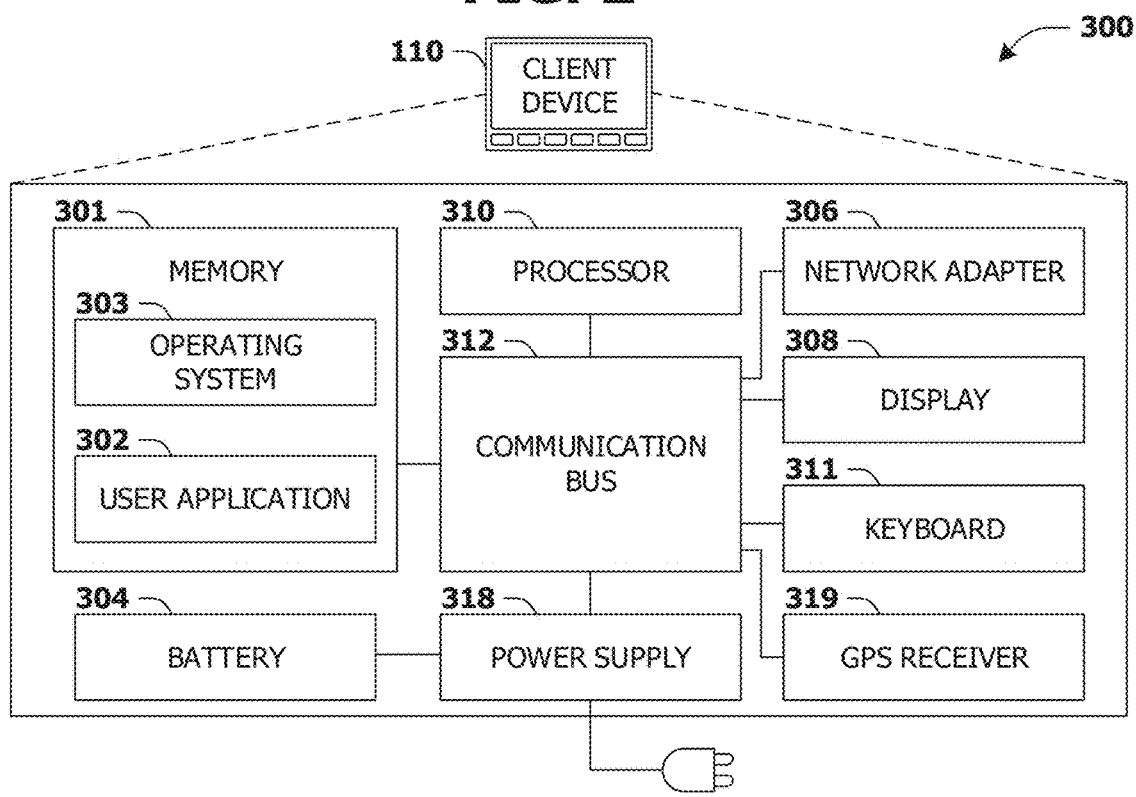
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for securing resources are provided. For example, a user (and/or a device associated with the user) may access and/or interact with a service, such as a website, an application, etc. that provides resources associated with a user account of the user. For example, the service may be a bank account service, an email service, a messaging service, a social network service and/or a different type of service. In some examples, a login interface associated with the service may be displayed. A request to access resources of the service, associated with the user account, may be transmitted by the device. In some examples, a verification process, such as a two-step verification process, a multi-factor authentication (MFA) process, a single-factor authentication process, etc. may be performed in order to verify an identity of the user (e.g., to verify that the user interacting with the login interface is associated with the user account). For example, the request may comprise a username and/or a password. The first device may be provided with access to the resources and/or the user may interact with the resources using a user interface on the first device.

However, the user may leave the first device unattended (e.g., the user may move to a different location). This may provide an opportunity for a second user (e.g., a hostile user) to interact with the resources using the user interface and/or perform malicious actions (e.g., consume information associated with the user account, copy information associated with the user account, perform unwanted transactions, etc.). Thus, in accordance with one or more of the techniques presented herein, a distance between the first device and a second device, associated with the user account, may be monitored. For example, the second device may be a phone of the user, a wearable computer of the user, etc. It may be determined that the user left the first device unattended by determining that the distance between the first device and the second device is greater than a threshold distance. Responsive to determining that the distance between the first device and the second device is greater than the threshold distance, the first device may be denied access to the resources to prevent hostile users from interacting with the resources and/or performing malicious actions.

Figure 4:
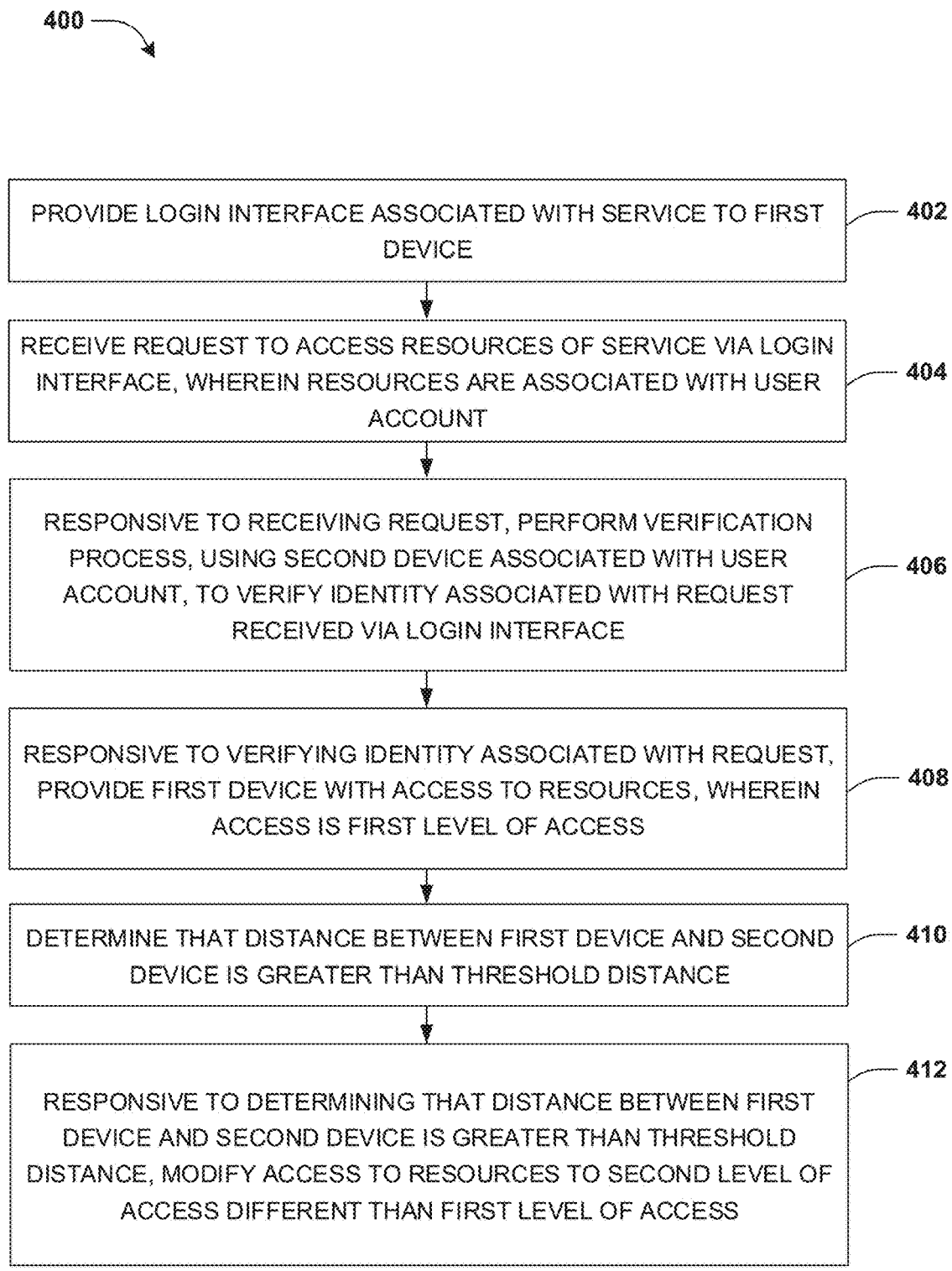
FIG. 4 is a flow chart illustrating an example method for securing resources.

An embodiment of securing resources is illustrated by an example method 400 of FIG. 4. A user, such as user Jill, (e.g., and/or a client device associated with the user) may access and/or interact with a service that provides resources associated with a user account of the user. For example, the service may be a bank account service (e.g., an internet banking service), an email service, a messaging service, a social network service, etc. In some examples, the resources may be accessed using a service interface of an application (e.g., a mobile bank application, an email application, a messaging application, a browser, a social network application, etc.). At 402, a login interface associated with the service may be provided to the client device. For example, the login interface may be part of the service interface. Alternatively and/or additionally, the login interface may be provided to the client device by one or more servers associated with the service.

For example, a graphical user interface of the client device may be controlled to display the login interface. In some examples, the login interface may comprise a first selectable input corresponding to a request to access the resources of the service associated with the user account. Alternatively and/or additionally, the login interface may comprise one or more text fields corresponding to login information associated with the user account. For example, the login information may comprise a username and/or a password associated with the user account. In some examples, the login information may be entered into the one or more text fields.

Alternatively and/or additionally, the one or more text fields may be pre-filled based upon prior instances that the login information was entered into the one or more text fields. For example, the login information may be stored in the one or more servers and/or the client device. Responsive to accessing the service interface and/or the login interface of the service interface, the login information may be accessed and/or automatically entered into the one or more text fields. In some examples, responsive to a selection of the first selectable input, the request to access the resources of the service (associated with the user account) may be transmitted by the client device to the one or more servers (associated with the service).

At 404, the request to access the resources of the service may be received via the login interface. For example, the request may be received by the one or more servers. For example, the request may comprise the login information (e.g., the username and/or the password). In some examples, rather than the request being transmitted by the client device responsive to the selection of the first selectable input, the request may be transmitted by the client device responsive to client device accessing the server interface. For example, responsive to accessing the service interface and/or the login interface of the service interface, the login information may be accessed and/or the request (comprising the login information) may be transmitted to the one or more servers (automatically).

Alternatively and/or additionally, the request may comprise different authentication information and/or a different type of authentication factor may be relied upon for the request. For example, a camera of the client device may take a picture of the user. One or more image analysis techniques may be performed to determine whether the user is authorized to access the resources. Alternatively and/or additionally, a fingerprint scanner of the client device may scan and/or collect a fingerprint of the user which may be used to determine whether the user is authorized to access the resources by comparing the fingerprint with a stored fingerprint associated with the user account. Alternatively and/or additionally, an eye scanner of the client device may scan an eye of the user which may be used to determine whether the user is authorized to access the resources by comparing the scan of the eye with stored information about an eye associated with the user account. The eye scanner may be used to perform a retinal scan, iris recognition, etc. Alternatively and/or additionally, a microphone of the client device may collect audio comprising a voice of the user which may be used to determine whether the user is authorized to access the resources by comparing the audio with a stored audio indicative of one or more voices associated with the user account.

At 406, responsive to receiving the request, a verification process (e.g., an authentication process) may be performed using a second client device associated with the user account, to verify an identity associated with the request. For example, the verification process may be performed to verify that the user interacting with the login interface is associated with the user account. In some examples, the verification process may be a two-step verification process and/or an MFA process.

The second client device may be selected for being utilized to perform the verification process based upon a determination that the second client device is associated with the user and/or the user account. For example, it may be determined that the second client device is normally on the user's person (e.g., that the user typically carries the second client device and/or is near the second client device at most times of the day). Alternatively and/or additionally, the second client device may be selected as a verification device by the user (e.g., the second client device may be selected as the verification device via a security settings interface associated with security settings of the user account). For example, the second client device may be a phone, a smartphone, a tablet, a wearable computer (e.g., a smartwatch), and/or a different type of client device associated with the user.

Alternatively and/or additionally, it may be determined that a plurality of client devices (comprising the second client device) is associated with the user and/or the user account. For example, the plurality of client devices may be selected as verification devices by the user using the security settings interface. The second client device may be selected from the plurality of client devices for being utilized to perform the verification process based upon a determination that the second client device is more frequently used by the user than other client devices of the plurality of client devices. Alternatively and/or additionally, the second client device may be selected from the plurality of client devices for being utilized to perform the verification process based upon a determination that the second client device is more frequently on the user's person than other client devices of the plurality of client devices. For example, the second client device may be a wearable computer (e.g., a smartwatch and/or a different type of wearable computer) and/or a third client device of the plurality of client devices may be a tablet. The second client device (e.g., the wearable computer) may be selected from the plurality of client devices for being utilized to perform the verification process based upon a determination that the second client device is more likely to be on the user's person than the third client device (e.g., the tablet). Alternatively and/or additionally, the second client device may be selected from the plurality of client devices for being utilized to perform the verification process based upon types of devices of the plurality of client devices.

In some examples, the verification process may comprise transmitting a notification to the second client device. The notification may comprise an indication that the request to access the resources was received. For example, the notification may be a push notification transmitted to the second client device. Alternatively and/or additionally, the notification may be transmitted via a messaging service. Alternatively and/or additionally, the notification may be transmitted via text messaging (e.g., the notification may be a text message).

In some examples, the notification may comprise an indication of a passcode. For example, the passcode may be generated responsive to receiving the request. In some examples, the passcode may comprise a plurality of characters (e.g., digits, letters and/or symbols). For example, an amount of characters of the plurality of characters may be 4 characters, 5 characters, 6 characters, etc. In some examples, an authentication interface may be displayed using the client device. For example, the authentication interface may comprise instructions for the user to view the passcode and/or to perform the verification process using the passcode. The authentication interface may be a part of the service interface.

For example, the authentication interface may comprise a plurality of selectable inputs, wherein each selectable input of the plurality of selectable inputs comprises a representation of a passcode option. For example, a second selectable input of the plurality of selectable inputs may correspond to the passcode. Responsive to a selection of the second selectable input, the identity associated with the request may be verified. Alternatively and/or additionally, responsive to a selection of a third selectable input corresponding to a passcode option different than the passcode, the identity associated with the request may not be verified.

Alternatively and/or additionally, the authentication interface may comprise a first text field. For example, the passcode may be entered into the first text field (by the user). In some examples, responsive to the passcode being correctly entered into the first text field, the identity associated with the request may be verified. Alternatively and/or additionally, responsive to the passcode being incorrectly entered into the first text field, the identity associated with the request may not be verified.

Alternatively and/or additionally, rather than the notification (transmitted to the second client device) comprising the indication of the passcode, the authentication interface (displayed on the client device) may comprise an indication of the passcode. For example, the notification may comprise a second text field that the passcode may be entered into. Alternatively and/or additionally, the notification may comprise a second plurality of selectable inputs wherein each selectable input of the second plurality of selectable inputs corresponds to a representation of a passcode option. For example, responsive to the passcode being correctly entered into the second text field, the identity associated with the request may be verified. Alternatively and/or additionally, responsive to a selection of a selectable input of the second plurality of selectable inputs corresponding the passcode, the identity associated with the request may be verified.

Alternatively and/or additionally, rather than using the passcode to verify the identity associated with the request, the notification may comprise a third selectable input corresponding to consent of the user for providing the client device with access to the resources. Alternatively and/or additionally, the notification may comprise a fourth selectable input corresponding to blocking access to the resources from the client device. For example, responsive to a selection of the third selectable input, the identity associated with the request may be verified. Alternatively and/or additionally, responsive to a selection of the fourth selectable input, the identity associated with the request may not be verified.

Alternatively and/or additionally, rather than using the second client device to perform the verification process, the verification process may be performed merely based upon the request. For example, the verification process may be performed based upon one or more of the username, the password, the picture, the fingerprint, the eye scan, the audio indicative of the voice, a security question, etc.

At 408, responsive to verifying the identity associated with the request, the client device may be provided with access to the resources. For example, the access may be a first level of access. The first level of access may correspond to access to a portion of the resources associated with the user account and/or all of the resources associated with the user account. For example, an account interface may be displayed using the client device. For example, the account interface may be a part of the service interface. For example, information (e.g., content, emails, messages, news content, images, videos, audio, bank account information, etc.) associated with the resources may be provided (e.g., displayed) for consumption using the account interface. Alternatively and/or additionally, actions (e.g., modifying information, sending emails, sending messages, uploading content to platforms, transferring funds, etc.) may be performed using the account interface. Alternatively and/or additionally, the user account may be managed using the account interface (e.g., settings of the user account may be changed).

At 410, it may be determined that a distance between the client device and the second client device is greater than a threshold distance. For example, the threshold distance may be 3 feet, 10 feet, 13 feet, a space between the client device and the second client device where a wall and/or a different obstruction is between the client device and the second device, etc. For example, a first location of the client device may be monitored. Alternatively and/or additionally, a second location of the second client device may be monitored. For example, it may be determined that the distance between the client device and the second client device is greater than the threshold distance based upon the first location and the second location. The first location may be compared with the second location to determine and/or monitor the distance. For example, an operation (e.g., a mathematical operation) may be performed using the first location and the second location to determine the distance.

In some examples, the first location may be monitored using first location information received from a wireless network to which the client device is connected. For example, the wireless network may be a WiFi network, a hotspot and/or a wireless access point (WAP). Alternatively and/or additionally, the second location may be monitored using second location information received from the wireless network (e.g., the second client device may be connected to the wireless network) and/or from the second client device.

For example, the first location information may comprise first received signal strength indicators (RSSIs) associated with communications between the client device and the wireless network. For example, the first RSSIs may correspond to communications transmitted by the wireless network, to the client device (e.g., the first RSSIs may be indicative of signal strengths of communications received by the client device from the wireless network). Alternatively and/or additionally, the first RSSIs may correspond to communications transmitted by the client device, to the wireless network (e.g., the first RSSIs may be indicative of signal strengths of communications received by the wireless network from the client device).

Alternatively and/or additionally, the second location information may comprise second RSSIs associated with communications between the second client device and the wireless network. For example, the second RSSIs may correspond to communications transmitted by the wireless network, to the second client device (e.g., the second RSSIs may be indicative of signal strengths of communications received by the second client device from the wireless network). Alternatively and/or additionally, the second RSSIs may correspond to communications transmitted by the client device, to the wireless network (e.g., the second RSSIs may be indicative of signal strengths of communications received by the wireless network from the second client device). In some examples, the first location may be determined based upon the first RSSIs and/or the second location may be determined based upon the second RSSIs.

Alternatively and/or additionally, the first location information may comprise first angle of arrival (AoA) information associated with a first direction that communications transmitted by the client device travel to reach one or more antennas associated with the wireless network. The second location information may comprise second AoA information associated with a second direction that communications transmitted by the second client device travel to reach the one or more antennas. In some examples, the first location may be determined based upon the first RSSIs and/or the first AoA information. Alternatively and/or additionally, the second location may be determined based upon the second RSSIs and/or the second AoA information.

Alternatively and/or additionally, the first RSSIs may correspond to signal strengths associated with communications between the client device and a first set of wireless networks. For example, the first set of wireless networks may comprise the first wireless network and/or one or more other wireless networks. For example, the one or more other wireless networks may comprise one or more WiFi networks, one or more hotspots and/or one or more WAPs. Alternatively and/or additionally, the second RSSIs may correspond to signal strengths associated with communications between the second client device and a second set of wireless networks. For example, the second set of wireless networks may comprise the same wireless networks as the first set of wireless networks. Alternatively and/or additionally, the second set of wireless networks may comprise different wireless networks than the first set of wireless networks.

In some examples, one or more RSSI localization techniques and/or one or more trilateration techniques may be performed using the first RSSIs to calculate a first estimated location of the client device relative to antennas associated with the set of wireless networks. For example, the first location (of the client device) may be determined based upon the first estimated location. Alternatively and/or additionally, the one or more RSSI localization techniques and/or the one or more trilateration techniques may be performed using the second RSSIs to calculate a second estimated location of the client device relative to antennas associated with the second set of wireless networks. The second location (of the second client device) may be determined based upon the second estimated location.

Alternatively and/or additionally, the first location information may comprise first satellite navigation information comprising first longitude measurements, first latitude measurements and/or first altitude measurements associated with the first location. Alternatively and/or additionally, the second location information may comprise second satellite navigation information comprising second longitude measurements, second latitude measurements and/or second altitude measurements associated with the second location. For example, the first satellite navigation information and/or the second satellite navigation information may be received from a satellite navigation system, such as a global navigation satellite system (GNSS) (e.g., Global Positioning System (GPS), Global Navigation Satellite System (GLONASS), Galileo, etc.).

In some examples, the first location may be determined based upon merely the first satellite navigation information. Alternatively and/or additionally, the first location may be determined based upon a combination of the first satellite navigation information, the first AoA information and/or the first RSSIs. Alternatively and/or additionally, the second location may be determined based upon merely the second satellite navigation information. Alternatively and/or additionally, the second location may be determined based upon a combination of the second satellite navigation information, the second AoA information and/or the second RSSIs.

Alternatively and/or additionally, the distance may be determined by the client device. For example, an instructions message may be transmitted to the client device comprising instructions associated with determining and/or monitoring the distance. For example, the instructions message may comprise instructions for the client device to transmit a plurality of messages to the second client device based upon a time-rate. For example, the client device may transmit a first message of the plurality of messages at a first time. The client device may transmit a second message of the plurality of messages at a second time based upon the first time and the time-rate. In an example, the time-rate may be 1 Hz and the client device may transmit a message every second. Alternatively and/or additionally, the client device may transmit a message one of every 15 seconds, every 30 seconds, every 1 minute, etc.

In some examples, messages of the plurality of messages may be authenticated using a message authentication code (MAC) (e.g., a hash-based message authentication code (HMAC)). In some examples, the instructions message may comprise instructions for the client device to monitor for a plurality of reply messages from the second client device. For example, each reply message of the plurality of reply messages may be transmitted by the second client device responsive to receiving a message of the plurality of messages. In some examples, each reply message of the plurality of reply messages may be indicative of the distance between the client device and the second client device.

For example, the distance between the client device and the second client device may be determined based upon the plurality of reply messages. For example, each reply message of the plurality of reply messages may comprise an RSSI associated with a message of the plurality of messages corresponding to the reply message. For example, the client device may transmit a third message of the plurality of messages to the second client device. A signal strength of the third message may be determined by the second client device (e.g., the signal strength may be a measure of power present in the third message being received by the second client device). The second client device may generate a first RSSI indicative of the signal strength of the third message. The second client device may transmit a first reply message to the client device comprising the first RSSI. The distance may be determined based upon the first RSSI. Alternatively and/or additionally, it may be determined that the distance between the client device and the second client device is greater than the threshold distance by determining that an RSSI comprised within a reply message of the plurality of reply messages is less than an RSSI threshold.

Alternatively and/or additionally, the client device may determine a first signal strength of the first reply message (e.g., the first signal strength may be a measure of power present in the first reply message being received by the client device). For example, the distance may be determined based upon the first signal strength. Alternatively and/or additionally, it may be determined that the distance between the client device and the second client device is greater than the threshold distance by determining that a signal strength associated with the client device receiving a reply message is less than a signal strength threshold.

Alternatively and/or additionally, it may be determined that the distance between the client device and the second client device is less than the threshold distance based upon reception of a reply message associated with a message of the plurality of messages. For example, the client device may transmit a fourth message of the plurality of messages to the second client device. The client device may monitor for a reply message, associated with the fourth message, transmitted by the second client device. Responsive to receiving a second reply message, of the plurality of reply messages, from the second client device, it may be determined that the distance between the client device and the second client device is less than the threshold distance. Alternatively and/or additionally, responsive to monitoring for a reply message for a threshold period of time after the fourth message was transmitted and/or not receiving a reply message associated with the fourth message within the threshold period of time, it may be determined that the distance between the client device and the second client device is greater than the threshold distance.

In some examples, communications between the client device and the second client device may be performed using a wireless system, such as a Bluetooth system, a Bluetooth Low energy system, a near-field communication (NFC) system and/or a different type of wireless system. For example, the plurality of messages may be transmitted to the second client device using the wireless system. Alternatively and/or additionally, the plurality of reply messages may be transmitted to the client device using the wireless system.

In some examples, responsive to determining that the distance between the client device and the second client device is greater than the threshold distance, a fifth message may be transmitted to the one or more servers (by the client device). The fifth message may be indicative of the distance between the client device and the second client device being greater than the threshold distance. Alternatively and/or additionally, the fifth message may comprise an indication of the distance, a signal strength of a reply message and/or an RSSI comprised within a reply message. For example, it may be determined (by the one or more servers) that the distance between the client device and the second client device is greater than the threshold distance based upon the fifth message.

In some examples, responsive to determining that the distance between the client device and the second client device is greater than the threshold distance, the distance may be monitored to determine whether the distance decreases to less than the threshold distance. For example, at a third time, it may be determined that the distance between the client device and the second client device is greater than the threshold distance. After the third time, it may be determined at a fourth time that the distance between the client device and the second client device decreases to less than the threshold distance.

At 412, responsive to determining that the distance between the client device and the second client device is greater than the threshold distance, the access to the resources may be modified to a second level of access different than the first level of access. Alternatively and/or additionally, the access to the resources may be modified to the second level of access based upon a determination that the distance between the client device and the second client device is greater than the threshold distance and that the client device is unlocked. For example, responsive to a determination that an operating system, a browser, and/or the service interface is locked and/or unable to be used (by a hostile user), the access to the resources may not be modified to the second level of access. Alternatively and/or additionally, responsive to determining that the distance between the client device and the second client device decreases from greater than the threshold distance to less than the threshold distance, the access to the resources may be modified from the second level of access to the first level of access (automatically).

In some examples, the modifying the access to the second level of access may comprise denying the client device access to the resources. For example, the graphical user interface of the client device may be controlled to stop displaying the account interface. Alternatively and/or additionally, the graphical user interface of the client device may be controlled to display a secure mode interface, wherein the resources may not be displayed and/or may not be accessed. Alternatively and/or additionally, the secure mode interface may comprise a fifth selectable input corresponding to the login interface and/or performing a third verification process to access the resources.

Alternatively and/or additionally, the modifying the access to the second level of access may comprise denying the client device access to a first set of resources, of the resources and/or providing the client device with access to a second set of resources, of the resources. For example, the graphical user interface of the client device may be controlled to modify the account interface to comprise merely the second set of resources. Alternatively and/or additionally, responsive to a second request to access a resource of the first set of resources (e.g., the second request to access the resource may be received via a selection of a selectable input of the account interface associated with the resource), the resource may not be provided to the client device. For example, responsive to the second request to access the resource of the first set of resources, the account interface may display a second notification. The second notification may comprise an indication that the client device does not have access to the first set of resources and/or that the distance between the client device and the second client device is greater than the threshold distance. Alternatively and/or additionally, the second notification may comprise a sixth selectable input corresponding to the login interface such that a fourth verification process may be performed.

In some examples, the client device may be denied access to the first set of resources based upon first levels of risk associated with the first set of resources. For example, the first levels of risk may be greater than a first threshold level of risk. For example, it may be determined that a hostile user having access to the first set of resources may be detrimental to the user (e.g., it may be determined that the hostile user may perform malicious actions using the first set of resources, if the hostile user has access to the first set of resources). Alternatively and/or additionally, the client device may be provided with access to the second set of resources based upon second levels of risk associated with the second set of resources. For example, the second levels of risk may be less than the first threshold level of risk. For example, it may be determined that the hostile user having access to the second set of resources may not be detrimental to the user (e.g., it may be determined that the hostile user may not perform malicious actions using the second set of resources).

In a first example, the user account may be associated with a banking account and/or the service interface may be associated with an internet banking service. The first set of resources (of which the client device is denied access to) may comprise a first resource associated with transferring funds to a second banking account, a second resource associated with viewing previous transactions, a third resource associated with changing settings, such as the password, of the user account, etc. For example, it may be determined that the first levels of risk associated with the first set of resources are higher than the first threshold level of risk (e.g., a hostile user having access to the first set of resources may be detrimental to the user). Alternatively and/or additionally, the second set of resources (of which the client device is provided access to) may comprise a fourth resource associated with paying bills, a fifth resource associated with accessing customer service information, etc. For example, it may be determined that the second levels of risk associated with the second set of resources are lower than the first threshold level of risk (e.g., a hostile user having access to the second set of resources may not be detrimental to the user).

In a second example, the user account may be associated with an email account and/or the service interface may be associated with an email service. The first set of resources (e.g., of which the client device is denied access to) may comprise a sixth resource associated with sending emails to other users, a seventh resource associated with deleting emails, an eighth resource associated with copying text from an email, etc. For example, it may be determined that the first levels of risk associated with the first set of resources are higher than the first threshold level of risk. Alternatively and/or additionally, the second set of resources (e.g., of which the client device is provided access to) may comprise a ninth resource associated with viewing emails, a tenth resource associated with searching for emails, etc. For example, it may be determined that the second levels of risk associated with the second set of resources are lower than the first threshold level of risk.

In some examples, the modifying the access to the resources may be performed based upon a duration of time that the distance between the client device and the second client device is greater than the threshold distance. For example, responsive to the duration of time exceeding a threshold duration of time, the access to the resources may be modified to the second level of access. Alternatively and/or additionally, responsive to the duration of time exceeding a second threshold duration of time, the access to the resources may be modified to a third level of access. For example, the second threshold duration of time may be greater than the first threshold duration of time. Alternatively and/or additionally, responsive to the distance between the client device and the second client device exceeding a second threshold distance, the access to the resources may be modified to the third level of access (and/or a fourth level of access).

In some examples, the modifying the access to the resources from the second level of access to the third level of access, may comprise denying the client device access to the resources. Alternatively and/or additionally, the modifying the access to the resources from the second level of access to the third level of access, may comprise denying the client device access to a third set of resources, of the resources, and providing the client device with access to a fourth set of resources, of the resources. In some examples, the modifying the access to the resources from the second level of access to the third level of access, may comprise denying the client device access to the third set of resources based upon a second threshold level of risk (rather than the first threshold level of risk). For example, the second threshold level of risk may be less than the first threshold level of risk. For example, third levels of risk associated with the third set of resources may be greater than the second threshold level of risk. Alternatively and/or additionally, fourth levels of risk associated with the fourth set of resources may be lower than the second threshold level of risk.

For example, the third set of resources may comprise each resource of the first set of resources. Alternatively and/or additionally, the third set of resources may comprise one or more resources of the second set of resources that are associated with one or more levels of risk determined to be higher than the second threshold level of risk. Alternatively and/or additionally, the fourth set of resources may comprise one or more resources of the second set of resources that are associated with one or more second levels of risk determined to be higher than the second threshold level of risk.

In the first example (where the user account is associated with the banking account), responsive to the duration of time exceeding the second threshold duration of time, the access to the resources may be modified to the third level of access. For example, the third set of resources (of which the client device is denied access to in the third level of access) may comprise the first resource, the second resource and the third resource, from the first set of resources (of which the client device is denied access to in the second level of access). Alternatively and/or additionally, the third set of resources may further comprise one or more resources from the second set of resources (of which the client device is provided access to in the second level of access). For example, the third set of resources may comprise the fourth resource, from the second set of resources, based upon a determination that a level of risk associated with the fourth resource is greater than the second threshold level of risk.

In some examples, rather than modifying the access based upon a determination that the distance between the client device and the second client device is greater than the threshold distance, the access may be modified based upon a determination that a second distance between the client device and a fourth client is greater than the threshold distance. For example, rather than monitoring the distance between the client device and the second client device, merely the second distance between the client device and the fourth client device may be monitored by the one or more servers and/or by the client device. Alternatively and/or additionally, in addition to monitoring the distance between the client device and the second client device, the second distance between the client device and the fourth client device may be monitored.

For example, one or more wireless networks associated with the client device may be scanned to identify a second plurality of client devices associated with the user account (e.g., the client device may be connected to the one or more wireless networks). The second plurality of client devices (comprising the second client device) may be connected to the one or wireless networks. Alternatively and/or additionally, one or more client devices of the second plurality of client devices may be connected to the client device (e.g., the second plurality of client devices may be paired with the client device) via the one or more wireless networks (e.g., Bluetooth, Bluetooth Low Energy, WiFi, NFC, etc.). Alternatively and/or additionally, the second plurality of client devices may be connected to each other (e.g., the second client device may be paired with the fourth client device).

In some examples, one or more second client devices may be selected from the second plurality of client devices to be monitored, wherein one or more distances between the client device and the one or more second client devices may be monitored. For example, the one or more second client devices may be selected from the second plurality of client devices to be monitored based upon a determination that the one or more second client devices are used frequently, based upon a determination that the one or more second client devices are on the user's person frequently and/or based upon types of devices of the one or more second client devices.

For example, the second client device may be a smartphone and/or the third client device may be a wearable computer (e.g., a smartwatch), a tag (e.g., an RFID tag on the user's person), a Bluetooth Low Energy device, etc. For example, the fourth client device may be connected to the second client device (e.g., the fourth client device may be paired with the second client device). For example, the fourth client device may be identified by scanning for client devices connected to the second client device and/or the client device. Alternatively and/or additionally, the fourth client device may be selected from the second plurality of client devices to be monitored, wherein the second distance between the client device and the fourth client device may be monitored. The fourth client device may be selected from the second plurality of client devices to be monitored based upon a determination that the fourth client device is on the user's person frequently, that the fourth client device is connected to the second client device and/or that the fourth client device is associated with the user account. Alternatively and/or additionally, the fourth client device may be selected from the second plurality of client devices to be monitored based upon a third request received from the client device indicative of a selection of the fourth client device.

For example, responsive to the fourth client device being selected from the second plurality of client devices to be monitored, the client device may be connected to the fourth client device and/or the second distance between the client device and the fourth client device may be monitored (e.g., using messages comprising RSSIs, by determining signal strengths associated with reply messages, etc.). Alternatively and/or additionally, responsive to the fourth client device being selected from the second plurality of client devices to be monitored, a third location of the fourth client device may be monitored and/or the third location may be compared with the first location of the client device to determine whether the second distance between the third location and the first location is greater than the threshold distance.

In some examples, responsive to modifying the access to the resources, a fifth verification process may be performed. The fifth verification process may be performed responsive to receiving a fourth request to access the resources. For example, the login interface may be displayed responsive a selection of the fifth selectable input (via the secure mode interface displayed responsive to modifying the access to the resources). The fourth request to access the resources may be received via the login interface. In some examples, the second client device may not be available for the verification process (e.g., the second client device may be powered off, the second client device may be broken, etc.). Accordingly, the fifth verification process may be performed using a different client device associated with the user account. Alternatively and/or additionally, the fifth verification process may be performed using different authentication information and/or a different type of authentication factor, in addition to the username and/or the password. For example, the verification process may be performed using the picture of the user, the fingerprint of the user, the eye scan of the user, the audio of the voice of the user, and/or additional information associated with the user account (e.g., a security question), in addition to the login information.

In some examples, the access to the resources may be modified to the second level of access based upon first signals (e.g., video, images, etc.) received from the camera of the client device. For example, the first signals received from the camera may be monitored using one or more image analysis techniques. For example, responsive to detecting that the user is moving away from the client device and/or that the user is no longer within a first view of the camera, the access to the resources may be modified to the second level of access. Alternatively and/or additionally, responsive to detecting that a different user is near the client device and/or is using the client device, the access to the resources may be modified to the second level of access. Alternatively and/or additionally, responsive to detecting that the user is moving towards the client device, that the user is adjacent to (e.g., in front of) the client device and/or that the user is using the client device, the access to the resources may be modified from the second level of access to the first level of access (automatically).

Alternatively and/or additionally, the access to the resources may be modified to the second level of access based upon second signals (e.g., video, images, etc.) received from a second camera of the second client device. For example, the first view of the camera and/or a second view of the second camera may be analyzed using one or more image analysis techniques to determine whether the camera and the second camera are near each other (e.g., in the same room, in the same area, within the threshold distance of each other, near one or more same objects, etc.). Responsive to detecting that the camera and the second camera are not near each other and/or are not within the threshold distance of each other, the access to the resources may be modified to the second level of access. Alternatively and/or additionally, the first view of the camera and/or the second view of the second camera may be used to supplement the first location information and/or the second location information for determining the first location of the client device and/or the second location of the second client device.

Alternatively and/or additionally, the access to the resources may be modified to the second level of access based upon third signals received from one or more devices connected to the client device. For example, the one or more devices may comprise a mouse, a keyboard, etc. In some examples, the one or more devices may comprise one or more fingerprint scanners. For example, one or more fingerprints of the user may be monitored using the one or more fingerprint scanners. Responsive to determining that the one or more fingerprints are not detected for a third threshold duration of time, the access to the resources may be modified to the second level of access. Alternatively and/or additionally, responsive to determining that one or more fingerprints associated with a different user are detected, the access to the resources may be modified to the second level of access.

Alternatively and/or additionally, the access to the resources may be modified to the second level of access based upon fourth signals received from one or more sensors (e.g., heat sensors, infrared sensors, etc.). For example, the one or more sensors may be comprised within the one or more devices. Alternatively and/or additionally, the one or more sensors may be positioned such that it may be detected whether the user is near the client device. For example, the fourth signals may be monitored. For example, responsive to detecting that the user is no longer near the client device, the access to the resources may be modified to the second level of access.

It may be appreciated that one or more of the techniques presented herein may be implemented using any type of interface, application and/or service, such as an operating system of a client device, software installed on the client device, etc. Accordingly, using one or more of the techniques herein, responsive to determining that a distance between the client device and a second client device, associated with the client device, is greater than a threshold distance, access to information and/or files of the client device may be denied until a verification process is performed. Alternatively and/or additionally, responsive to determining that an authorized user is not near the client device, access to information and/or files of the client device may be denied until a verification process is performed.

FIGS. 5A-5G illustrate examples of a system 501 for securing resources. A user 502, such as user Jack, (e.g., and/or a first client device 500 associated with the user) may access and/or interact with a service that provides resources associated with a user account of the user 502. For example, the service may be an internet banking service (e.g., and/or a different type of service) and/or the user account may be associated with a banking account. In some examples, the resources may be accessed using a service interface of an application (e.g., a mobile bank application).

Figure 5A:
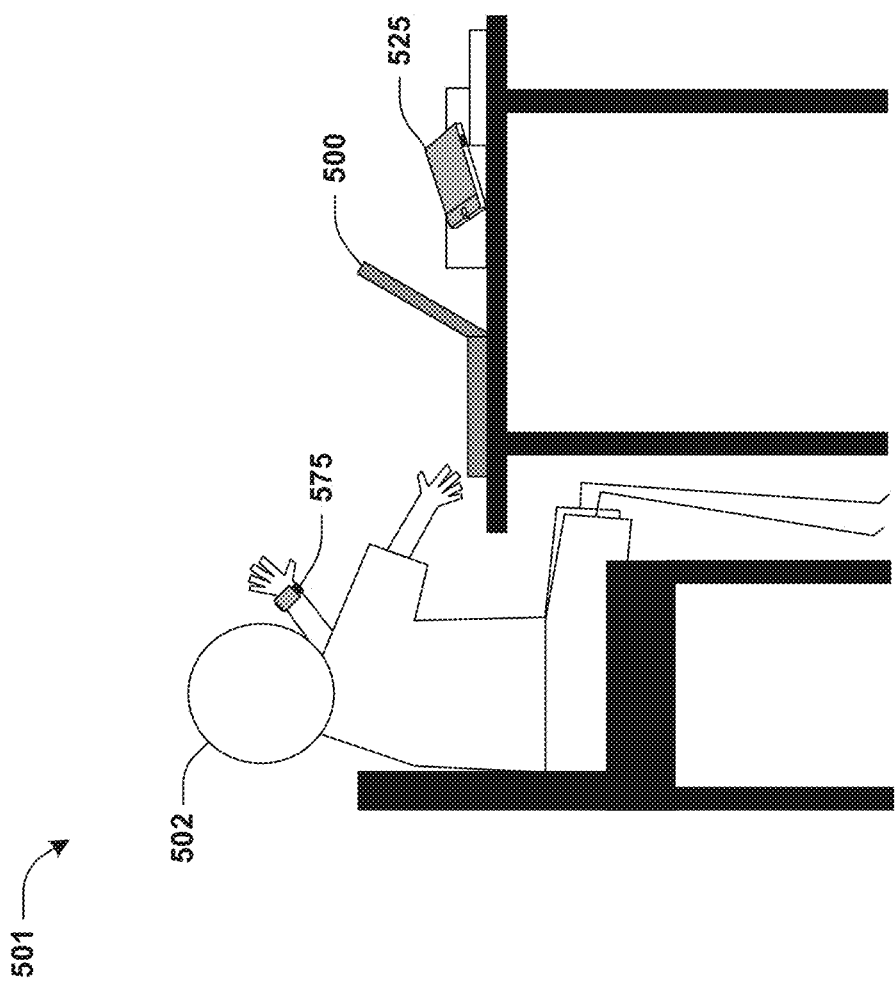
FIG. 5A is a component block diagram illustrating an example system for securing resources, where a user interacts with a first client device.

FIG. 5A illustrates the user 502 interacting with the first client device 500. For example, the first client device 500 may be used (by the user 502) to interact with the service interface. In some examples, the first client device 500, a second client device 525 and/or a third client device 575 may be associated with the user 502. For example, the first client device 500 may be a laptop, the second client device 525 may be a smartphone and/or the third client device 575 may be a wearable computer (e.g., a smartwatch).

FIG. 5B illustrates the graphical user interface of the first client device 500 being controlled to display a login interface 506 of the service interface. The login interface 506 may comprise a first text field 508 corresponding to a username of the user account. Alternatively and/or additionally, the login interface 506 may comprise a second text field 510 corresponding to a password of the user account. For example, the username may be entered into the first text field 508 using a keyboard of the first client device 500, a conversational interface of the first client device 500, etc. Alternatively and/or additionally, the password may be entered into the second text field 510 using the keyboard, the conversational interface, etc. The login interface 506 may comprise a first selectable input 512 corresponding to a request 520 to access the resources of the service.

Figure 5C:
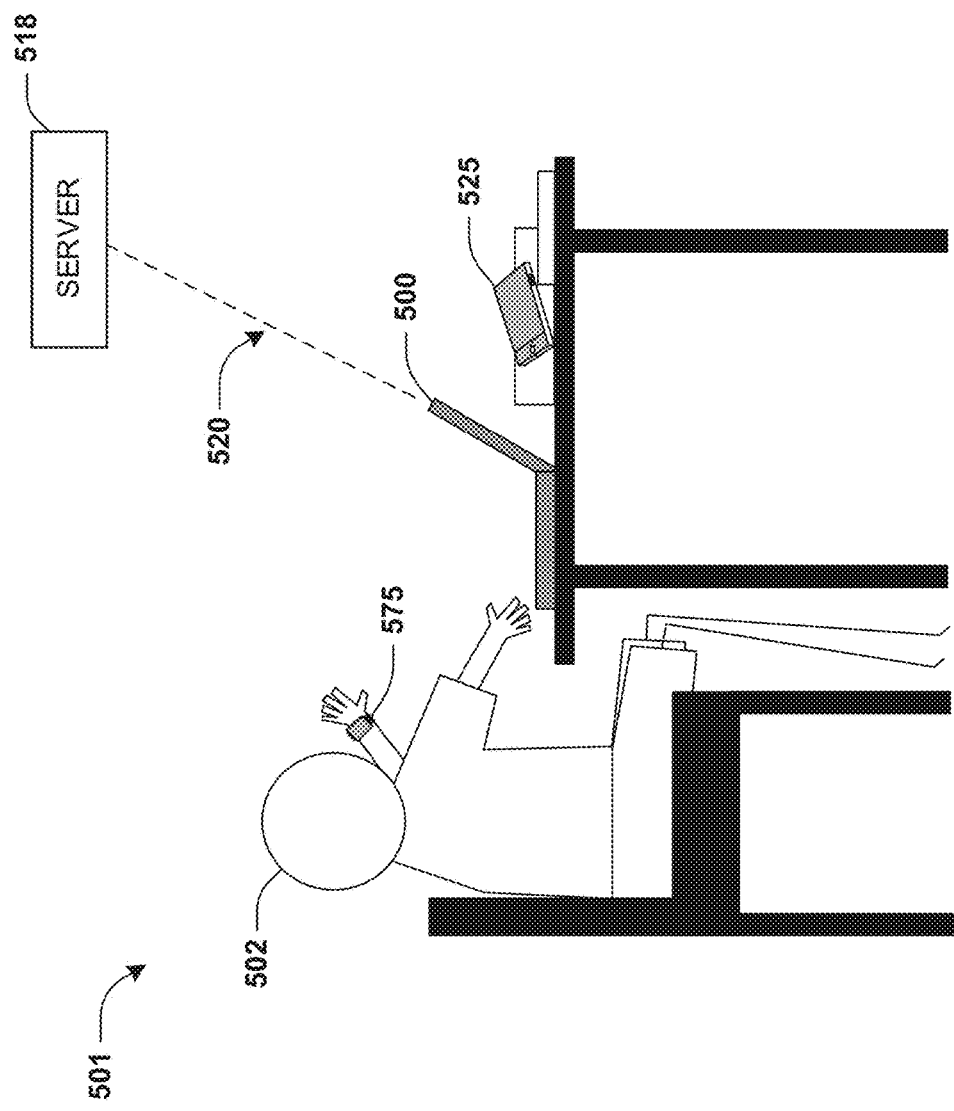
FIG. 5C is a component block diagram illustrating an example system for securing resources, where a request to access resources of a service is transmitted to one or more servers associated with the service.

FIG. 5C illustrates the request 520 being transmitted to one or more servers 518 associated with the service. For example, the request 520 may be transmitted by the first client device 500 to the one or more servers 518 responsive to a selection of the first selectable input 512. In some examples, the request 520 may comprise login information (e.g., the username and/or the password). In some examples, responsive to receiving the request 520, a verification process (e.g., an authentication process) may be performed using the second client device 525 associated with the user account, to verify an identity associated with the request 520. For example, the verification process may be performed to verify that the user 502 interacting with the login interface 506 is associated with the user account.

The second client device 525 may be selected for being utilized to perform the verification process based upon a determination that the second client device 525 is associated with the user 502 and/or the user account. For example, it may be determined that the second client device 525 is normally on the user 502's person (e.g., that the user 502 typically carries the second client device 525 and/or is near the second client device 525 at most times of the day). Alternatively and/or additionally, the second client device 525 may be selected as a verification device by the user 502 using a security settings interface associated with settings of the user account. In some examples, the verification process may comprise transmitting a notification 524 to the second client device 525.

Figure 5D:
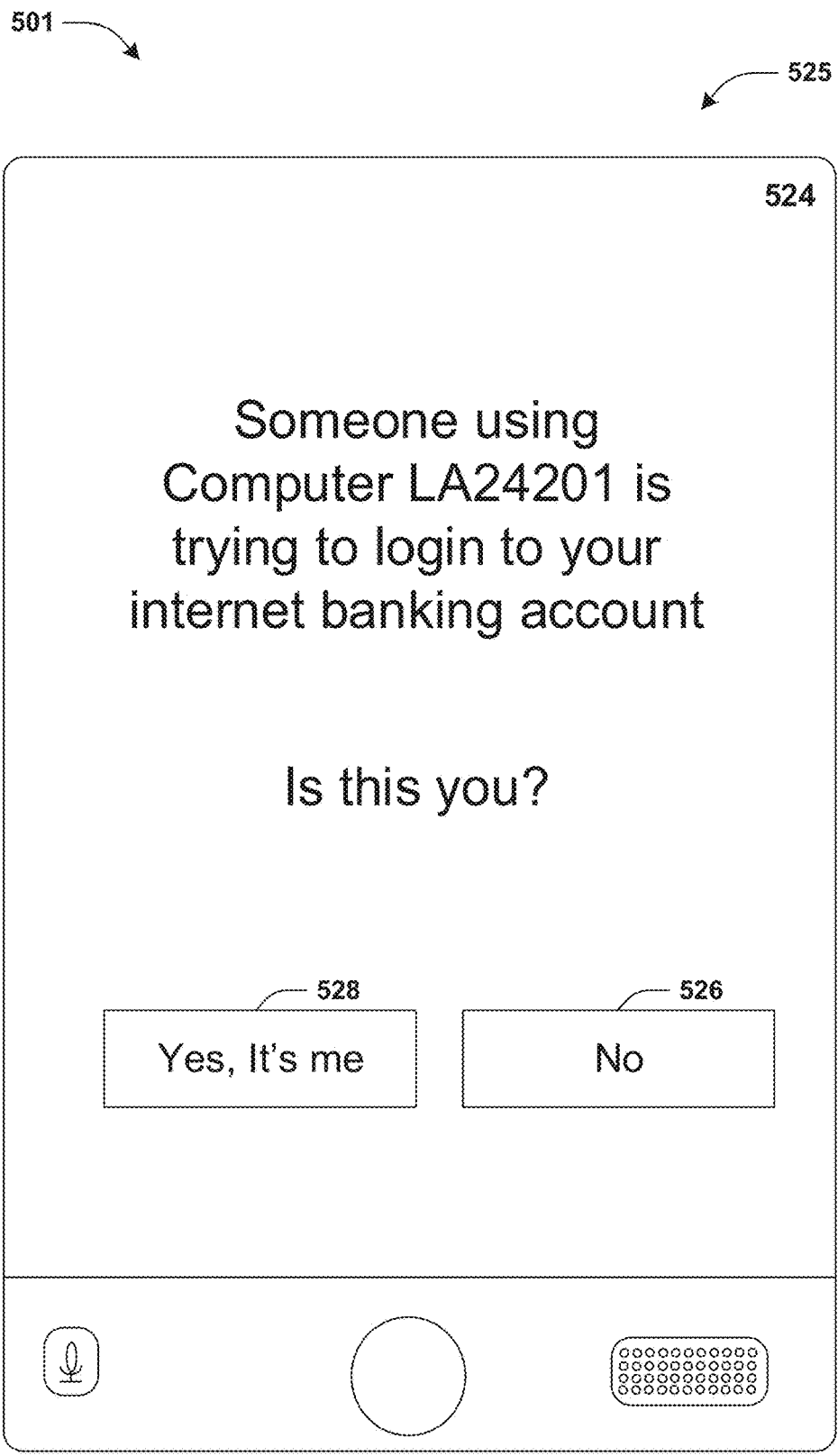
FIG. 5D is a component block diagram illustrating an example system for securing resources, where a second graphical user interface of a second client device is controlled to display a notification.

FIG. 5D illustrates a second graphical user interface of the second client device 525 being controlled to display the notification 524. For example, the notification 524 may comprise an indication that the request 520 to access the resources was received. For example, the notification 524 may be a push notification transmitted to the second client device 525. For example, the notification 524 may comprise a second selectable input 528 corresponding to consent of the user 502 for providing the first client device 500 with access to the resources. Alternatively and/or additionally, the notification 524 may comprise a third selectable input 526 corresponding to blocking access to the resources from the first client device 500. For example, responsive to a selection of the second selectable input 528, the identity associated with the request 520 may be verified. In some examples, responsive to verifying the identity associated with the request 520, the first client device 500 may be provided with access to the resources, wherein the access is a first level of access.

Figure 5E:
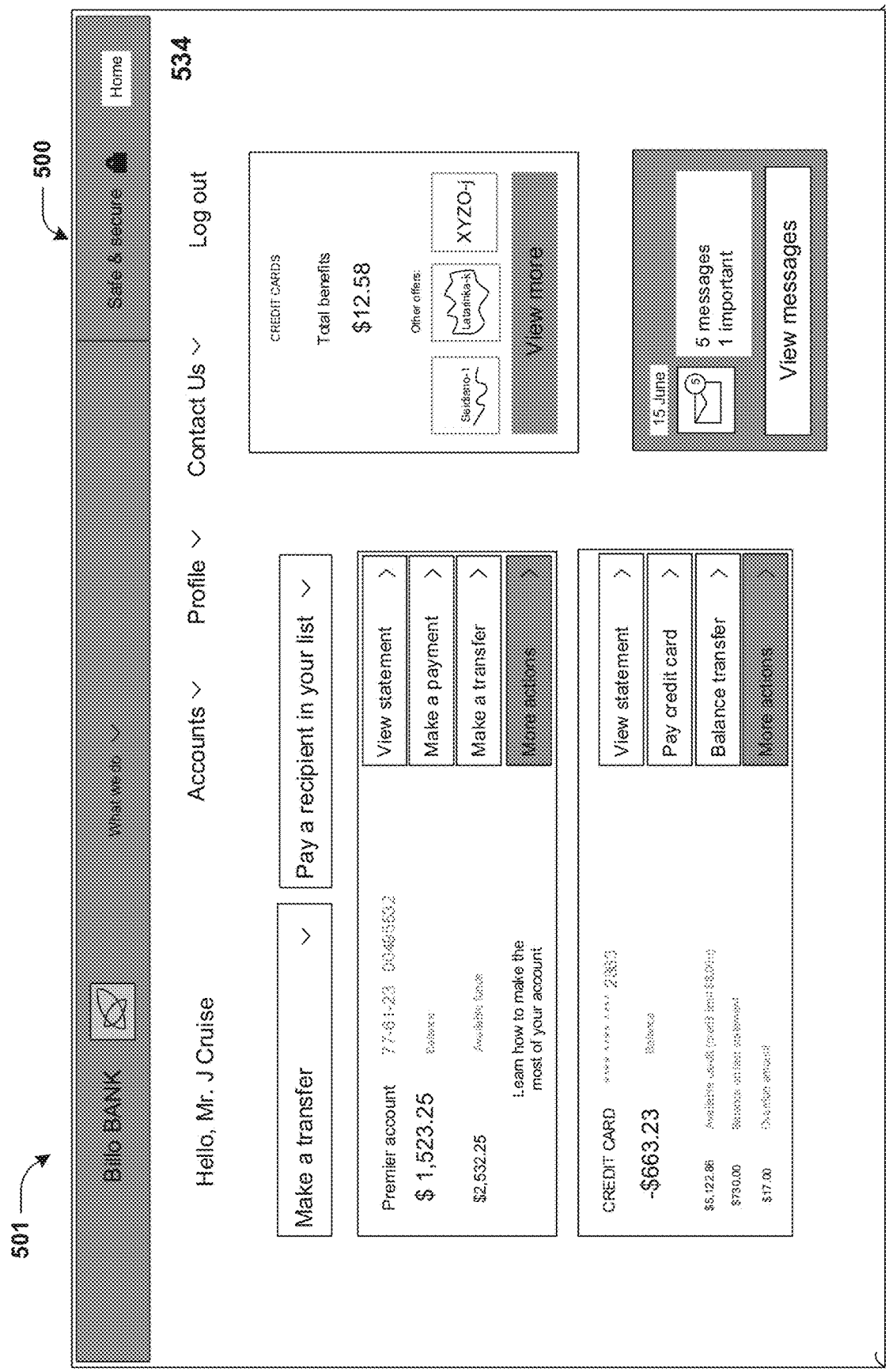
FIG. 5E is a component block diagram illustrating an example system for securing resources, where a graphical user interface of a first client device is controlled to display an account interface of a service interface.

FIG. 5E illustrates the graphical user interface of the first client device 500 being controlled to display an account interface 534 of the service interface. For example, content (e.g., bank account statements, messages, etc.) associated with the resources may be consumed using the account interface 524. Alternatively and/or additionally, actions (e.g., transferring funds, paying bills, etc.) associated with the resources may be performed using the account interface 534. Alternatively and/or additionally, the user account may be managed using the account interface 534 (e.g., settings of the user account may be changed).

In some examples, one or more wireless networks associated with the first client device 500 may be scanned to identify the second client device 525 and/or the third client device 575. For example, the second client device 525 may be connected to the one or more wireless networks. Alternatively and/or additionally, the third client device 575 may be connected to the second client device 525 and/or to the first client device 500 (via Bluetooth, Bluetooth Low Energy, WiFi, NFC, etc.). In some examples, the second client device 525 may be selected to be monitored, wherein a first distance between the first client device 500 and the second client device 525 may be monitored. For example, the second client device 525 may be selected to be monitored based upon a determination that the second client device 525 was used in the verification process, based upon a determination that the second client device 525 is used frequently, based upon a determination that the second client device 525 is on the user 502's person frequently and/or based upon a type of device of the second client device 525. Alternatively and/or additionally, the third client device 575 may be selected to be monitored, wherein a first distance between the first client device 500 and the third client device 575 may be monitored. For example, the third client device 575 may be selected to be monitored based upon a determination that the third client device 575 is connected to the second client device 525 and/or to the first client device 500, based upon a determination that the third client device 575 is used frequently, based upon a determination that the third client device 575 is on the user 502's person frequently and/or based upon a type of device of the third client device 575.

Alternatively and/or additionally, responsive to the second client device 525 being selected to be monitored, the first client device 500 may be connected to the second client device 525 (e.g., the first client device 500 may be paired with the second client device 525 using NFC, Bluetooth, etc.). Alternatively and/or additionally, the first distance between the second client device 525 and the first client device 500 may be monitored (e.g., using messages comprising RSSIs, by determining signal strengths associated with reply messages, etc.) by the first client device 500. Alternatively and/or additionally, responsive to the second client device 525 being selected to be monitored, a first location of the first client device 500 and a second location of the second client device 525 may be monitored (by the one or more servers 518). Alternatively and/or additionally, the second location may be compared with the first location to determine whether the first distance between the first location and the second location is greater than a threshold distance.

Alternatively and/or additionally, responsive to the third client device 575 being selected to be monitored, the first client device 500 may be connected to the third client device 575 (e.g., the first client device 500 may be paired with the third client device 575 using NFC, Bluetooth, etc.). Alternatively and/or additionally, the second distance between the third client device 575 and the first client device 500 may be monitored (e.g., using messages comprising RSSIs, by determining signal strengths associated with reply messages, etc.) by the first client device 500. Alternatively and/or additionally, responsive to the third client device 575 being selected to be monitored, the first location of the first client device 500 and a third location of the third client device 575 may be monitored (by the one or more servers 518). Alternatively and/or additionally, the third location may be compared with the first location to determine whether the second distance between the third location and the second location is greater than the threshold distance.

Figure 5F:
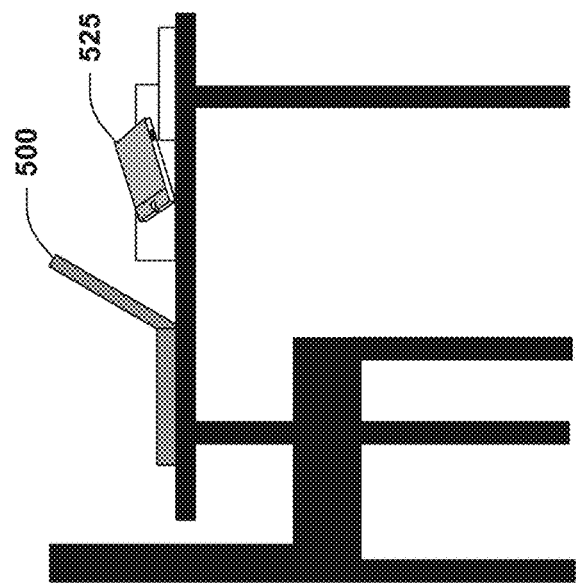
FIG. 5F is a component block diagram illustrating an example system for securing resources, where a second distance between a third client device and a first client device exceeds a threshold distance.
Figure 5F:
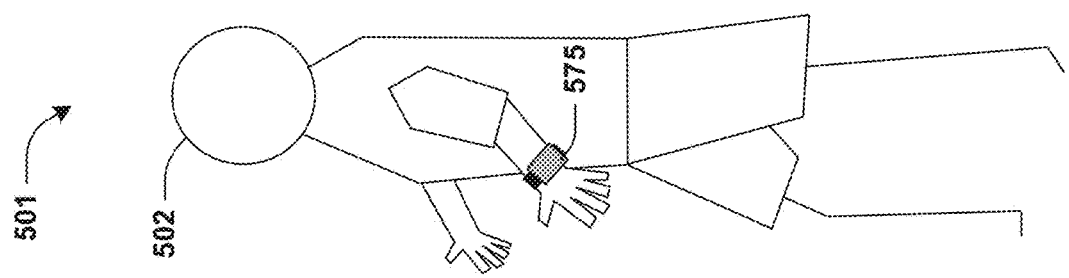
Figure 5G:
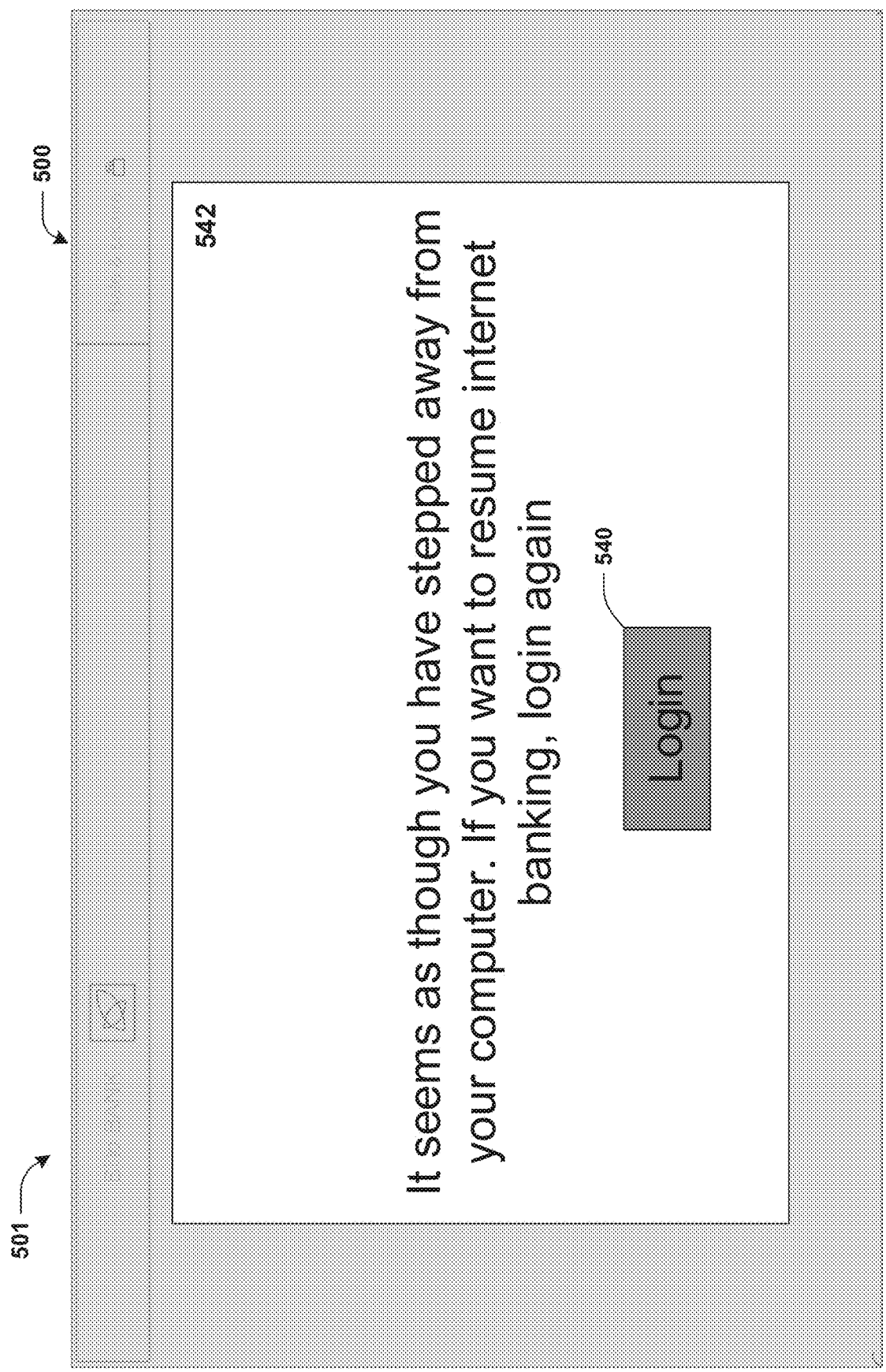
FIG. 5G is a component block diagram illustrating an example system for securing resources, where a graphical user interface of a first client device is controlled to display a secure mode interface of a service interface.

FIG. 5F illustrates the second distance between the third client device 575 and the first client device 500 exceeding the threshold distance. In some examples, responsive to determining that the second distance between the third client device 575 and the first client device 500 is greater than the threshold distance, the access to the resources may be modified to a second level of access. For example, the modifying the access to the second level of access may comprise denying the first client device 500 access to the resources. For example, the graphical user interface of the first client device 500 may be controlled to stop displaying the account interface 534. Alternatively and/or additionally, the graphical user interface of the first client device 500 may be controlled to display a secure mode interface 542, wherein the resources may not be displayed and/or may not be accessed. FIG. 5G illustrates the graphical user interface of the first client device 500 being controlled to display the secure mode interface 542 of the service interface. For example, the secure mode interface 542 may comprise a fourth selectable input 540 corresponding to the login interface 506 and/or performing a second verification process to access the resources.

It may be appreciated that the disclosed subject matter may protect a user from malicious actions being performed with resources associated with the user.

Implementation of at least some of the disclosed subject matter may lead to benefits including, but not limited to, preventing unauthorized access of a device and/or unauthorized access of resources comprising information (e.g., as a result of monitoring a distance between the device and a second device associated with an authorized user of the device, as a result of detecting that the distance exceeds a threshold distance, as a result of denying access to resources on the device responsive to detecting that the distance exceeds the threshold distance, etc.). Alternatively and/or additionally, implementation of at least some of the disclosed subject matter may lead to benefits including decreasing security resources needed to protect the device and/or the resources from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 6:
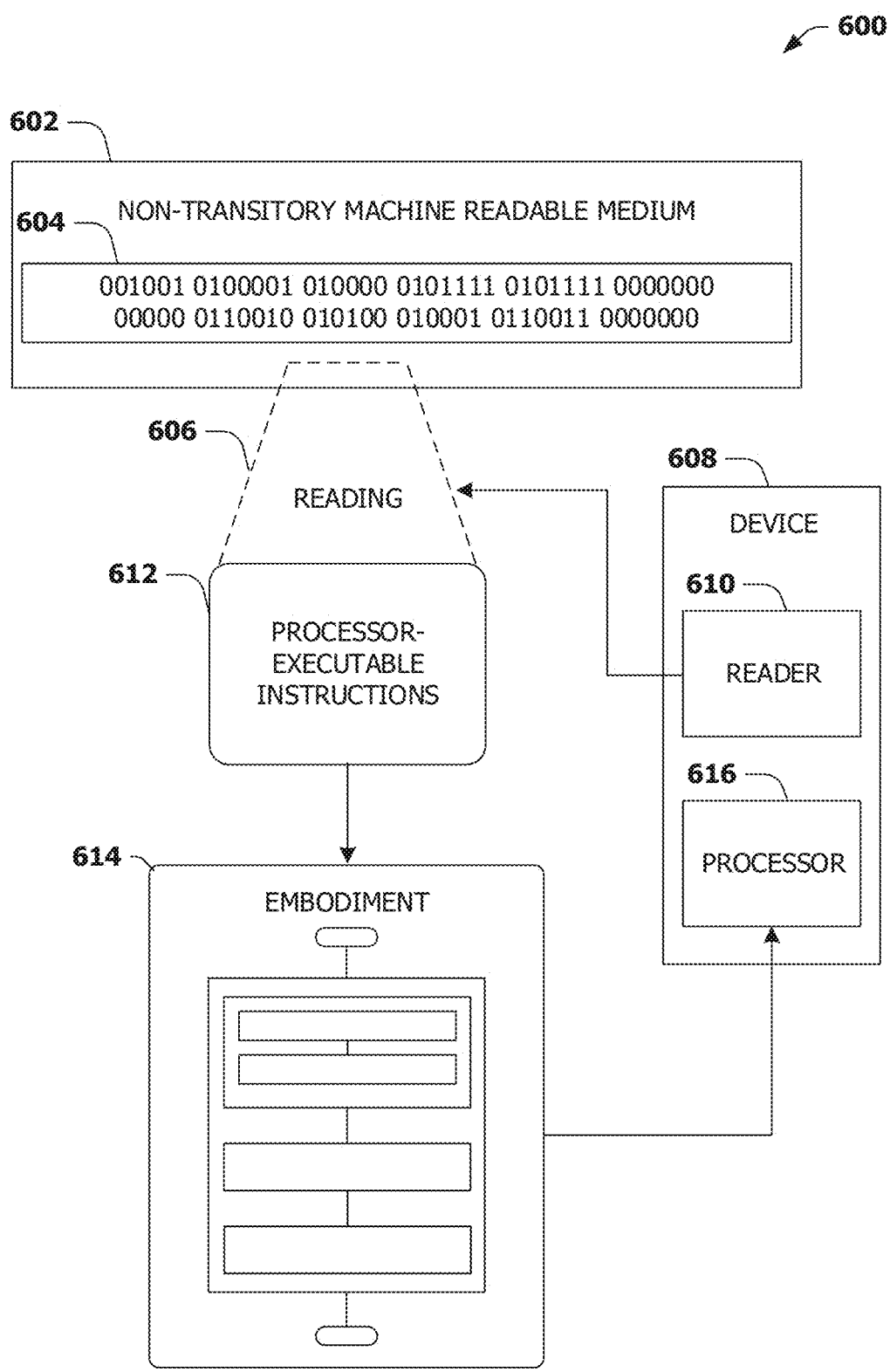
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   providing, to a first device, a login interface associated with a service;
   receiving a request to access resources of the service via the login interface, wherein the resources are associated with a user account;
   responsive to receiving the request, performing a verification process, using a second device associated with the user account, and verifying that an identity associated with the request received via the login interface is associated with the user account;
   responsive to verifying the identity associated with the request, providing the first device with access to the resources, wherein the access to the resources provided to the first device is a first level of access providing access to a first set of resources of the resources and a second set of resources of the resources;
   monitoring a distance between the first device and the second device;
   determining that the distance between the first device and the second device is greater than a threshold distance; and
   responsive to determining that the distance between the first device and the second device is greater than the threshold distance, modifying the access to the resources provided to the first device from the first level of access to a second level of access providing access to the first set of resources but not the second set of resources.

2. The method of claim 1, comprising:
   transmitting a message to the first device, wherein the message comprises instructions for the first device to:
   transmit a plurality of messages to the second device based upon a time-rate;
   monitor for a plurality of reply messages from the second device, wherein each reply message of the plurality of reply messages is associated with a message of the plurality of messages; and
   determine the distance between the first device and the second device based upon signal strengths associated with the plurality of reply messages.

3. The method of claim 2, wherein the determining that the distance between the first device and the second device is greater than the threshold distance is performed based upon a second message, received from the first device, indicative of the distance between the first device and the second device being greater than the threshold distance.

4. The method of claim 1, comprising:
   monitoring a first location of the first device; and
   monitoring a second location of the second device, wherein the determining that the distance between the first device and the second device is greater than the threshold distance is performed based upon the first location and the second location.

5. The method of claim 4, wherein:
the monitoring the first location is performed using first location information received from a wireless network that the first device is connected to; and
the monitoring the second location is performed using second location information received from the wireless network.

6. The method of claim 4, wherein:
the monitoring the first location is performed using first satellite navigation information associated with the first device; and
the monitoring the second location is performed using second satellite navigation information associated with the second device.

7. The method of claim 1, wherein the modifying the access to the resources comprises denying the first device access to the resources.

8. The method of claim 1, wherein the first set of resources are associated with performing one or more first actions in association with the user account and the second set of resources are associated with performing one or more second actions in association with the user account.

9. The method of claim 1, comprising:
determining a duration of time that the distance between the first device and the second device is greater than the threshold distance, wherein the modifying the access to the resources is performed based upon the duration of time exceeding a threshold duration of time.

10. The method of claim 9, wherein the second first set of resources is selected based upon the duration of time exceeding the threshold duration of time.

11. A computing device comprising:
a processor; and
memory comprising processor-executable instructions that when executed by the processor cause performance of operations, the operations comprising:
transmitting a request to access resources of a service using a first device, wherein the resources are associated with a user account;
performing a verification process using a second device associated with the user account and verifying that an identity associated with the request is associated with the user account;
in response to verifying the identity, displaying, on the first device, a user interface providing access to a first set of resources of the resources and a second set of resources of the resources;
monitoring a distance between the first device and the second device;
detecting that the distance between the first device and the second device is greater than a threshold distance; and
responsive to detecting that the distance between the first device and the second device is greater than the threshold distance:
transmitting a first message to a server, wherein the first message is indicative of the distance between the first device and the second device being greater than the threshold distance; and
displaying, on the first device, a second user interface providing access to the first set of resources but not the second set of resources.

12. The computing device of claim 11, wherein the monitoring the distance between the first device and the second device comprises:
transmitting a plurality of messages to the second device based upon a time-rate; and
receiving a plurality of reply messages from the second device, wherein each reply message of the plurality of reply messages is associated with a message of the plurality of messages.

13. The computing device of claim 12, the operations comprising:
receiving a first reply message of the plurality of reply messages, wherein the detecting that the distance is greater than the threshold distance is performed based upon a determination that a signal strength associated with the first reply message is lower than a signal strength threshold.

14. The computing device of claim 12, wherein the plurality of messages comprises a second message transmitted at a first time, the operations comprising:
monitoring for a reply message associated with the second message, wherein the detecting that the distance is greater than the threshold distance is performed based upon a determination that the reply message associated with the second message is not received within a threshold period of time after the first time that the second message was transmitted.

15. A non-transitory machine readable medium having stored thereon processor-executable instructions that when executed cause performance of operations, the operations comprising:
receiving a request to access resources of a service from a first device, wherein the resources are associated with a user account;
responsive to receiving the request, performing a verification process using a second device associated with the user account and verifying that an identity associated with the request received from the first device is associated with the user account;
responsive to verifying the identity associated with the request, providing the first device with access to the resources, wherein the access to the resources provided to the first device is a first level of access providing access to a first set of resources of the resources and a second set of resources of the resources;
monitoring a distance between the first device and the second device;
determining that the distance between the first device and the second device greater than a threshold distance; and
responsive to determining that the distance between the first device and the second device is greater than the threshold distance, modifying the access to the resources provided to the first device from the first level of access to a second level of access providing access to the first set of resources but not the second set of resources.

16. The non-transitory machine readable medium of claim 15, the operations comprising:
transmitting a message to the first device, wherein the message comprises instructions for the first device to:
transmit a plurality of messages to the second device based upon a time-rate;
monitor for a plurality of reply messages from the second device, wherein each reply message of the plurality of reply messages is associated with a message of the plurality of messages; and
determine the distance between the first device and the second device based upon signal strengths associated with the plurality of reply messages.

17. The non-transitory machine readable medium of claim 16, wherein the determining that the distance between the first device and the second device is greater than the threshold distance is performed based upon a second message, received from the first device, indicative of the distance between the first device and the second device being greater than the threshold distance.

18. The non-transitory machine readable medium of claim 15, the operations comprising:
- monitoring a first location of the first device; and
- monitoring a second location of the second device, wherein the determining that the distance between the first device and the second device is greater than the threshold distance is performed based upon the first location and the second location.

19. The non-transitory machine readable medium of claim 18, wherein:
- the monitoring the first location is performed using first location information received from a wireless network that the first device is connected to; and
- the monitoring the second location is performed using second location information received from the wireless network.

20. The non-transitory machine readable medium of claim 18, wherein:
- the monitoring the first location is performed using first satellite navigation information associated with the first device; and
- the monitoring the second location is performed using second satellite navigation information associated with the second device.

\* \* \* \* \*